United States Patent [19]

Bleikamp, Jr.

[11] 4,194,960

[45] Mar. 25, 1980

[54] ELECTRICAL CONNECTION FOR ELECTRODES

[75] Inventor: Roy H. Bleikamp, Jr., Chesterfield, Mo.

[73] Assignee: Monsanto Company, St. Louis, Mo.

[21] Appl. No.: 926,674

[22] Filed: Jul. 21, 1978

[51] Int. Cl.$^2$ ............................................. C25D 17/10
[52] U.S. Cl. ................................ 204/280; 204/290 R
[58] Field of Search ............ 204/280, 286, 196, 290 R

[56] References Cited

U.S. PATENT DOCUMENTS

| | | | |
|---|---|---|---|
| 2,758,080 | 8/1956 | Bernard | 204/286 |
| 2,924,637 | 2/1960 | Turner | 204/302 |
| 3,043,765 | 7/1962 | Bryan et al. | 204/286 |
| 4,098,663 | 7/1978 | Baboian | 204/286 |

Primary Examiner—T. M. Tufariello
Attorney, Agent, or Firm—Lawrence L. Limpus

[57] ABSTRACT

A method of connecting an electrical lead to an electrode is provided wherein the connection is mechanically tight and is protected from chemical attack. The electrical lead and a slug of electrically conductive material are compressed within a hole in the electrode to provide a tight mechanical connection. Insulating material is added to fill the remainder of the hole and a second insulating material is installed over the area of the connection to protect the area from chemical attack.

4 Claims, 5 Drawing Figures

ELECTRICAL CONNECTION FOR ELECTRODES

BACKGROUND OF THE INVENTION

This invention relates to the making of electrical connections between an electrical cable and an electrode, for example an anode, particularly when the electrode will be immersed within an electrolyte whereby the electrode will be subjected to sacrificial or destructive deterioration as a result of either chemical or electrical activity. More particularly this invention relates to making a mechanically tight electrical connection between an electrical cable and an electrode and to protecting the connection from an electrolyte to prevent mechanical failure and chemical attack.

In applications where electrodes are submerged within an electrolyte, the electrode may be subject to chemical attack. In addition, if the electrode is the anode, the positive electrode, in a direct current application, the electrode is usually sacrificial, that is it tends to disintegrate or "plate off" into the electrolyte as a result of ion release. The electrical connection to the electrode, if it is also immersed in the electrolyte, is usually the weakest link in the electrode system and is therefore destroyed first, rendering the electrode system ineffective.

This destruction of the electrical connection has been delayed with varying success in the past by insulating the connection from the electrolyte. However, insulation alone is not completely satisfactory.

SUMMARY OF THE INVENTION

It is the object of this invention to provide an electrical connection between an electrical cable and an electrode which is mechanically tight and is protected from chemical attack or electrical breakdown. It is a further object of this invention to provide an electrical connection between an electrical cable and an electrode which may be submerged in an electrolyte.

In furtherance of these objectives and others which may become apparent there is provided an electrical cable and an electrode which are to be connected together. A portion of the insulation is removed from the electrical cable and a hole is drilled in the electrode. The noninsulated end of the electrical cable and a slug of an electrically conductive material are inserted into the hole in the electrode. The slug of electrically conductive material is compressed to form a mechanically tight connection between the electrical cable and the electrode. The remaining portion of the hole in the electrode is filled with an insulating material and the surface of the portion of the electrode enclosing the connection is wrapped with a chemically resistant insulation.

BRIEF DESCRIPTION OF THE DRAWINGS

Attention is now directed to the drawings in which.

DETAILED DESCRIPTION OF THE PREFERRED EMBODIMENT

Referring now to FIGS. 1 through 4 wherein like numbers denote like or corresponding parts throughout the several views, the electrical connection of the present invention is shown connecting an electrical cable to an electrode.

Figure 1:
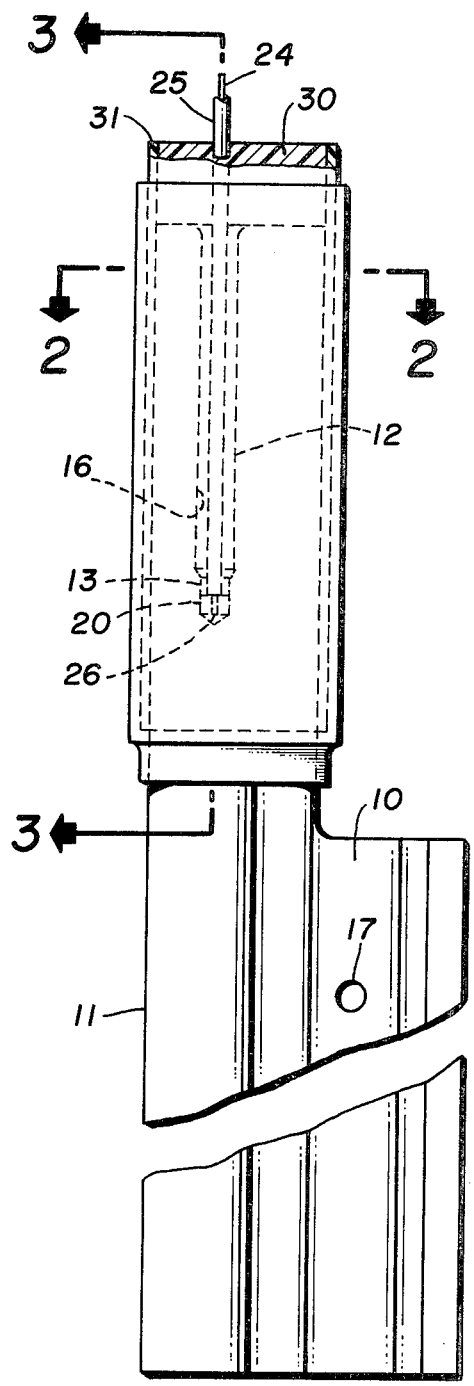
FIG. 1 shows the electrical connection of the present invention being used to connect an electrical cable to an electrode.
Figure 3:
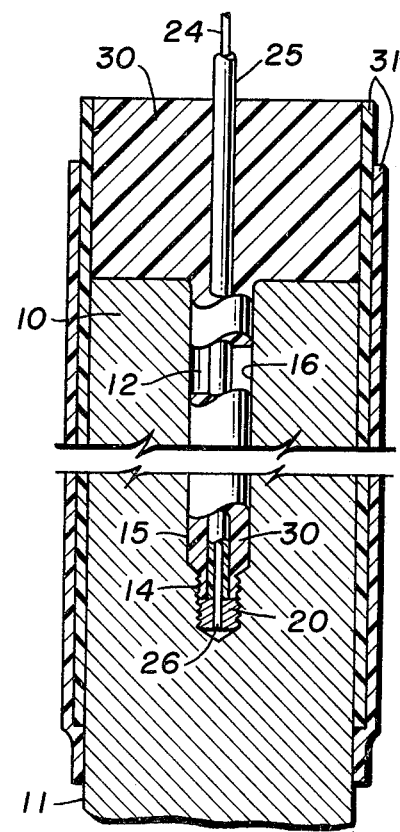
FIG. 3 is a cross-sectional view of the electrical connection of FIG. 1, taken at line 3—3.
Figure 4:
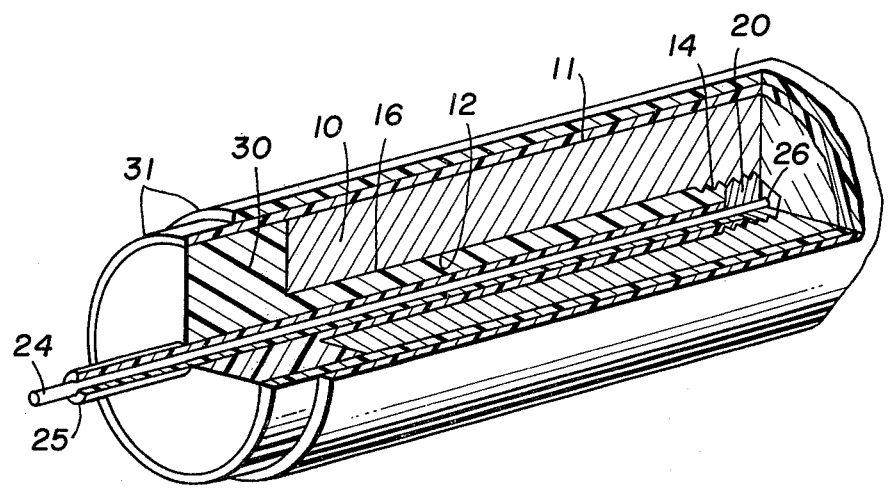
FIG. 4 shows a cut-away view of the electrical connection of the present invention used with a cylindrical electrode.

An electrode 10 with an exterior surface 11 has a hole 12 drilled axially approximately 15 cm. deep in one end. The internal portion 13 of hole 12, approximately 2.5 cm. in length, has a threaded side wall 14, while the external portion 15 of the hole is counterbored to have a relatively smooth side wall 16 having a greater diameter than the diameter of the internal portion 13 of the hole 12. An annular, or ring shaped, slug 20 of a soft metallic material such as solder is inserted within the internal portion 13 of hole 12. Electrical cable 24 is prepared for connection to the electrode 10 by stripping, that is removing, the insulation 25, from a short portion of the end 26 of electrical cable 24. The end 26 of electrical cable 24 is inserted into the annular slug 20 within the internal portion 13 of hole 12. The annular slug 20 is then deformed to provide a mechanically tight electrical connection between the electrical cable 24 and the electrode 10. A first insulating material 30 is poured into the hole 12 until the hole 12 is completely filled and the end of electrode 10 is covered by the first insulating material 30. The exterior surface 11 of electrode 10 is coated with at least one layer of a second insulating material 31. In FIGS. 1 and 3 two layers of the second insulating material 31 are shown. A hole 17 is drilled through a portion of electrode 10 perpendicular to the axis of the electrode 10 to facilitate lifting and moving the electrode 10 and to provide an attachment point for a float to support the electrode 10 when it is submerged within an electrolyte solution.

Figure 5:
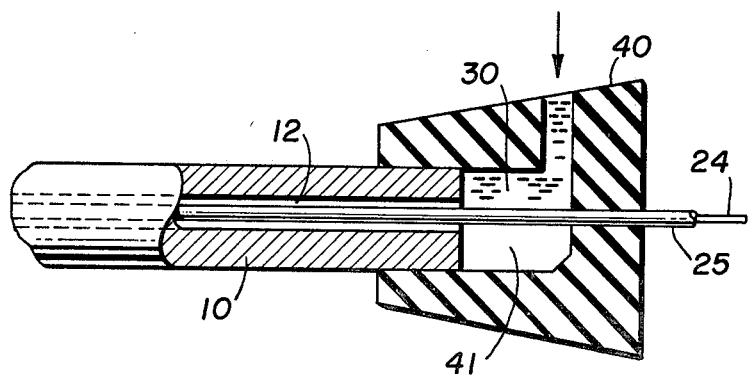
FIG. 5 shows a mold used to cast the insulation material used in the present invention.

A mold 40, shown in FIG. 5, is used to contain the first insulating material 30 within the hole 12 during the period required for the first insulating material 30 to cure, that is to solidify. The mold 40 is slipped over the electrical cable 24 and onto the end of the electrode 10 to form a cavity 41 at the end of the electrode 10. The mold 40 is secured to the electrode by a large diameter hose clamp (not shown). The first insulating material 30, in a liquid form, is poured into the mold 40 until it fills the hole 12 and cavity 41. The electrode 10 is then left to allow the first insulating material 30 to cure at which time the mold 40 is removed.

Referring again to FIGS. 1 through 3, the electrode 10 is formed from a railroad rail. To assure that the second insulating material 31 will properly insulate a portion of electrode 10, the railroad rail, the web of the rail is removed and the remaining main section of the rail is ground to remove any remaining concave surfaces or sharp corners. The grinding also removes all oxidation and scale to provide a clean exterior surface 11 on the electrode 10. A hole 12 approximately 15 cm. in depth is then drilled axially into the electrode 10. The internal portion 13, approximately 2.5 cm. long, of hole 12 is threaded while the remaining external portion 15 is counterbored to have relatively smooth sidewalls 16 having a greater diameter than the diameter of the threaded internal portion 13 of hole 12. The insulation 25 is stripped from about 2.5 cm. of the end 26 of electrical cable 24.

To make the electrical connection between the prepared electrode 10 and the electrical cable 24, an annular slug 20 of a soft metallic material such as solder is placed on the stripped end of the electrical cable 24. The end of the cable 24 and the annular slug 20 are together inserted into the hole 12 in the electrode 10 and pushed into the threaded internal portion 13 of the hole 12. A rod, for example a "U"-shaped staking tool, is then used to compress the annular slug 20, forcing it into the threads and providing a mechanically tight connection between the electrical cable 24 and the electrode 10. Since the annular slug 20 is formed from a metallic material this also provides a good electrical connection between the electrical cable 24 and the electrode 10.

Because of the length of the railroad rails, the electrode 10, it is impractical to stand them vertically for the next step in the fabrication of the electrical connection of this invention. Therefore a mold 40 was designed to permit the casting of a first insulating material 30 within the hole 12 while the electrode 10 remained in a horizontal position. The mold 40 is slipped over the electrical cable 24 and onto the end of the electrode 10 to form a cavity 41 extending axially outward from the end of electrode 10 approximately 3.8 cm. The mold 40 which is typically formed of a soft silicone rubber compound is then securely clamped to the electrode 10, for example by a large diameter hose clamp (not shown). The first insulating material 30, in its liquid state, is slowly poured into the mold 40 until the hole 12 and the cavity 41 are completely filled. Sufficient time is then allowed for the first insulating material 30 to cure and the mold 40 is removed. If a short electrode, one which can be handled vertically, is required, the complex mold 40 is not required as a simple funnel-shaped mold could then be used.

A urethane insulating material, for example Scotchcast ®resin manufactured by the 3-M Company, is preferrably used as the first insulating material 30. Urethane was chosen for its low viscosity in pouring, its reasonably long life during use, its fast curing at ambient temperatures, its flexibility when cured which reduced the possibility of flexural fatigue of the electrical cable 24, and its relatively low shrinkage during curing. Other materials, such as epoxies, can be used satisfactorily.

Finally at least one layer of a second insulating material 31 is placed over the portion of the first insulating material 30 extending from hole 12 and over a portion of the electrode 10. Extension of the second insulating material 31 over a portion of the electrode 10 assures that that protected portion of the electrode 10 which encloses the electrical connection will be the last portion to be chemically or electrically attacked. FIGS. 1 through 4 show two layers of the second insulating material 31 as an extra precaution against voltage breakdown or mechanical damage to the insulating layer. The second insulating material 31 may be heat-shrinkable tubing which contains an inner surface coating of a butyl based adhesive. The heat-shrinkable tubing is positioned and heat is applied, by a propane or butane torch or by use of an infra-red source, to shrink the tubing until it conforms to the shape of the electrode 10 and the portion of the first insulating material 30 extending from hole 12. Fiberglass or other materials may be used in place of the heat-shrinkable tubing as to the second insulating material.

Figure 2:
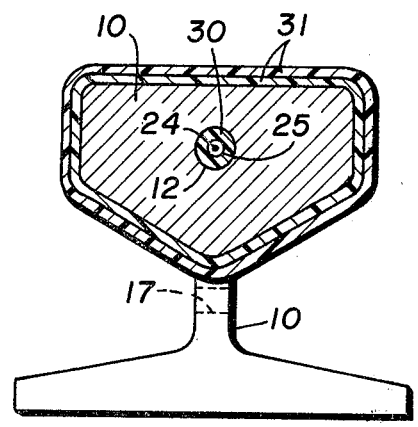
FIG. 2 is a cross-sectional view of the electrode of FIG. 1 taken at line 2—2.

FIGS. 1 through 3 show a railroad rail being used for the electrode 10. Railroad rails are easily available and provide an electrode of long length. However, an electrode of another shape, such as the cylindrical shape shown in FIG. 4, will perform as well as the railroad rail.

The electrical connection of this invention, as described above, provides an electrically and mechanically tight connection between an electrical cable and an electrode. The electrical connection is within the electrode, thus the connection is protected from chemical and electrical attack when the electrode is totally submerged within an electrolyte solution, for example when the electrode is used as a sacrificial anode for an electroendosmosis system in a pond to accelerate the consolidation solids within the pond or for electroplating systems.

Having thus shown and described the preferred embodiments of the present invention, it will be apparent to those skilled in the art that many modifications and variations are possible in light of the above teachings. It is therefore to be understood that my invention may be practiced other than as herein specifically described.

I claim:

1. An electrical connection between an electrical cable and an electrode comprising:
   an electrode, said electrode having an end having a hole drilled axially;
   an electrical cable, said electrical cable having insulation, said insulation being stripped from a portion of said electrical cable to form said electrical connection;
   an annular slug of an electrically conductive material, said annular slug being disposed about said stripped portion of said electrical cable and said stripped portion of said electrical cable and said annular slug being disposed within said hole within said electrode, said annular slug being compressed within said hole;
   a first insulating material filling said hole within said electrode and extending therefrom; and
   at least one layer of a second insulating material placed about the portion of said electrode enclosing said electrical connection to protect said electrode about said electrical connection from chemical attack.

2. The electrical connection of claim 1, wherein said hole in said electrode has an innermost portion, said innermost portion of said hole being threaded whereby the mechanical strength of said electrical connection is increased.

3. The electrical connection of claim 1, wherein said first insulating material is a urethane resin.

4. The electrical connection of claim 1, wherein said second insulating material is a heat shrinkable tubing.

* * * * *